Patented June 17, 1947

2,422,631

UNITED STATES PATENT OFFICE 2,422,631

MANUFACTURE OF ALIPHATIC AMINES AND ACID AMIDES

John F. Olin and Thomas E. Deger, Grosse Ile, Mich., assignors to Sharples Chemicals Inc., Philadelphia, Pa., a corporation of Delaware No Drawing. Application November 7, 1944, Serial No. 562,381

9 Claims. (Cl. 260—583)

This application is a continuation in part of our copending application Serial No. 416,463, filed October 25, 1941.

The present invention pertains to the manufacture of aliphatic amines and acid amides, and provides a procedure by which such compounds may be very economically produced by using, as the source of the alkyl radical of the desired compound, an olefin hydrocarbon.

The prior art teaches that aliphatic acids may be obtained by reacting carbon monoxide with an olefin and steam, and it also teaches that ammonia may be reacted with carbon monoxide to produce formamide. Insofar as known to us, however, the invention of the present application represents the first suggestion of a process by which an olefin may be reacted with carbon monoxide or carbon dioxide and ammonia or an amine having replaceable hydrogen to form an amide or amine.

In the practice of the invention to produce amines, or acid amides, the reactions by which these compounds are formed may be represented by the following equations, in which R, R', R² and R³ may be hydrogen or any alkyl radical and R⁴ and R⁵ may be hydrogen or any aliphatic, cyclo-aliphatic, heterocyclic or aromatic radical substituted for hydrogen of ammonia to form an amine:

I. 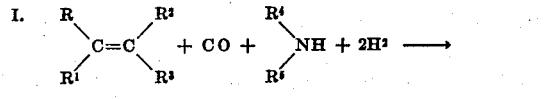

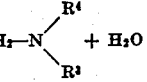

II. 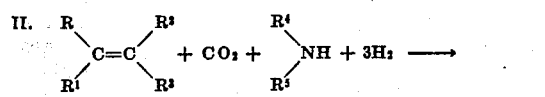

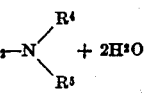

III. 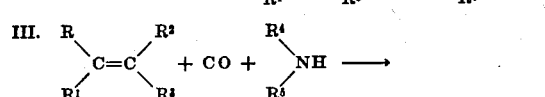

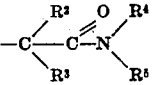

IV. 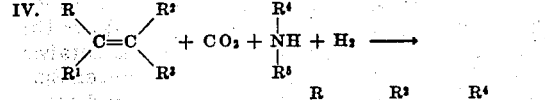

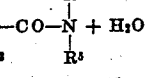

As will be seen from the above equations, the aminating agent may be either ammonia or an amine having an unsubstituted hydrogen atom. If ammonia is used, the amine or amide formed by the reaction will be a primary amine or amide, but if an amine is used, a secondary or tertiary amine or amide will be formed, having the organic radicals of the amine reactant attached to the nitrogen atom of the amine or amide resultant.

The amide resultants of Equations III and IV may be hydrogenated to form amines, and this hydrogenation may be accomplished either before or after separation of the amide from other constituents of the reaction mixture. These features, and the fundamental reaction of Equation III, above, are described and claimed in our co-pending application Serial No. 562,382 (Case 187), filed of even date herewith. Equation III is included above in discussion of the subject matter of the present application because of the fact that it represents an intermediate reaction in formation of the amine, or a side reaction in cases in which insufficient hydrogen is present in the reaction mixture to convert the desired nitrogen-containing resultant entirely to the amine, or in cases in which this reaction of hydrogenation is incomplete for some other reason. The distinction between the present application and our concurrently filed application referred to above is that, in the practice of the present invention, hydrogen will always be present in the initial reaction mixture, whereas in the concurrently filed application the hydrogen is introduced only after at least some initial reaction has taken place between other reactants.

A mixture of primary, secondary and tertiary amines will be formed, even in cases in which ammonia is used as the aminating agent, since a part of any primary amine formed in accordance with Equation I or Equation II will react with a further quantity of carbon monoxide or carbon dioxide, olefin and hydrogen in the reaction mixture to effect amination of a part of the amine formed to produce the secondary or tertiary amine.

In the amination of olefin hydrocarbons containing between 2 and 10 carbon atoms, the reaction will ordinarily be conducted in the vapor phase. The invention may be practiced by either batch or continuous operation. In case it is conducted batchwise, the reactants are pumped into an autoclave and intimately mixed by stirring, while they are heated to a temperature capable of promoting reaction under pressure.

In the preferred practice of the invention, the reaction by which the desired amide or amine is produced is accomplished by heating the reactants, after mixing them with each other, to the reaction temperature during stream flow of the mixture through a heating apparatus. Thus, in the manufacture of amides or amines from olefins containing between two and ten carbon atoms, the oxide of carbon, hydrogen, ammonia or aminating amine and olefin may be passed into confluence with each other and preheated to a temperature somewhat below the reaction temperature while being thoroughly mixed together by flow through the preheater. They are then passed from this preheater through a reaction chamber which may be heated to a temperature within the range between 250 and 450° C., the preferred range of temperatures for this reaction by either batch procedure or continuous operation being between 325° C. and 375° C., depending upon the particular hydrocarbon under treatment, the space velocity, the ratio of reactants, the aminating agent and the catalyst used to promote the reaction.

All of the hydrogen needed to form the desired amine may be introduced into the reaction mixture initially, or a part of the hydrogen may be introduced at an intermediate stage of the reaction, after some reaction has occurred in accordance with the above equations to form a mixture of amines and amides.

It will be evident from inspection of the above equations that the reaction is in every case essentially a condensation reaction, involving formation of a smaller number of molecules than the number of molecules entering into the reaction. It will thus be evident, from the well known law of Le Chatelier, that application of substantial super-atmospheric pressure will favor the progress of the reaction in the desired direction, and the preferred practice of the invention therefore involves application of high pressures, regardless of whether batch or continuous operation is employed. Pressures of from 500 to 20,000 lbs. per square inch or even higher may be employed to advantage in the practice of the invention, the only upper limit being that imposed by cost of compression and of apparatus capable of withstanding extremely high pressures. The formation of the desired amide or amine is also favored to an even greater extent, in cases in which the resultant amide or amine may be liquefied by the application of pressure, since the application of pressures sufficient to effect liquefaction in such instances strongly favors the formation of the desired product.

The olefin used in the practice of the invention may be obtained from any desired source, and it is not necessary that a relatively pure olefin be employed, as mixtures of olefins can be simultaneously aminated in the practice of the invention to form mixtures of amines, or mixtures of olefins and paraffins may be employed, the paraffins acting as an inert diluent. The olefin may be obtained, for example, from gases resulting from cracking of petroleum, or it may be obtained by successive steps of halogenating a paraffin hydrocarbon or hydrocarbon fraction and dehydro-halogenating the resulting halogen derivative or halogenated fraction. An excellent source of the amyl radical, for example, consists in amylenes obtained as by-products in the chlorination of pentane or in the ensuing hydrolysis of the resulting amyl chloride. Olefins containing between 2 and 5 carbon atoms, such as ethylene, propylene, butylene or amylene, separated from gases obtained in cracking petroleum, are particularly useful in the practice of the invention. A certain amount of formamide will be formed in the practice of the inventon by condensation of the carbon monoxde with the ammonia, and this formamide will be hydrogenated to form methyl amine. A part of this methyl amine will react with other constituents of the reaction mixture to form secondary or tertiary amines containing methyl radicals. In case only methyl amines are desired, the olefin will be omitted.

In the preferred practice of the invention, catalysts are used to speed up the reaction. Many catalysts are useful for this purpose, and the operation may be conducted by the use of a mixture of one or more dehydrating catalysts with one or more hydrogenation catalysts, or a single catalyst capable of promoting both the amide formation and the hydrogenation reaction may be employed. Examples of catalysts which may be employed to promote both reactions are zinc chromate, zinc tungstate, manganese chromate, manganese phosphate, manganese oxide mixed with phosphates, sulfates or halides of metals of groups 1 and 2 of the periodic series, chromium phosphate and cobalt and iron oxides, chromates, tungstates, phosphates, sulfates and halides.

Examples of dehydrating catalysts and hydrogenating catalysts which may be used in combination with each other are:

| Dehydrating Catalysts | Hydrogenation Catalysts |
| --- | --- |
| Activated Alumina | Nickel. |
| Silica gel | Copper. |
| Phosphoric acid | Platinum. |
| Phosphomolybdic acid | Copper chromite. |
| Thorium oxide | Palladium. |
| Titanium oxide | |
| Alkali metal chlorides and sulfates | |
| Alkaline earth metal chlorides | |

Combinations of one or more of the above dehydrating catalysts with one or more of the above hydrogenating catalysts are useful for carrying out the reactions shown in Equations I, II, III and IV. The combinations may be made by depositing any of the hydrogenating catalysts on a dehydrating catalyst support such as Activated Alumina or silica gel. The combined catalysts may also be made by pelleting mixtures of the two types of catalysts.

The invention as discussed above may be carried out in a stainless steel jacketed tubular preheater followed by a similarly jacketed stainless steel reactor through which the reactants flow from the preheater. A suitable heat transfer medium is passed through the jackets of the preheater and reactor during the preliminary stages of the operation in order to bring the catalyst mass up to the desired reaction temperature, and to heat the gases to be reacted. The reactants which may be easily liquefied are passed into the preheating and reaction zones by conventional chemical proportioning pumps, while the gases which are more difficult to condense, such as carbon monoxide or carbon dioxide, hydrogen and the lower olefins such as ethylene or propylene are proportioned into the continuous treating apparatus by double or triple stage compressors. The reactants enter at one end of the reactor, after being preheated, and are then passed through or across the catalyst mass and leave the other end of the reactor. An excellent catalyst for accomplishment of the amination reaction consists of a mixture of zinc chromate and manganese phosphate deposited on activated carbon. The products of the reaction passing from the reactor are fractionated by treatment in a series of fractionating columns, the non-condensable gases being vented from the system and recompressed for further treatment with olefin and ammonia in continued practice of the process. The liquid products may be separated from the remaining gases under an ammonia reflux under pressure, while the liquid products are fractionated from each other in the final column. In the use of the zinc chromate-manganese phosphate catalyst in manufacture of amines from olefins containing between 2 and 5 carbon atoms, for example, the mixture of olefin, carbon monoxide, ammonia and hydrogen may be passed through the reactor at a space velocity of 2500 to 3000 cu. ft. of gas (calculated at standard conditions) per cubic foot of catalyst per hour, the temperature of the catalyst being maintained at a point between 325 and 375° C. and the pressure being between 8000 and 8500 pounds per square inch. In such case, the reaction will take place in the gaseous phase, since the temperature is above the critical temperature of the reactants. In treatment of amylene in this manner, for example, a substantial conversion to hexyl amines is obtained, and n-propyl amines may be prepared similarly by treatment of ethylene.

While the particular ratio of reactants is not critical to the accomplishment of the process of the invention, best results are obtained in cases in which the carbon monoxide or dioxide is present in the reaction mixture in substantial excess of the ammonia, the ammonia is present in substantial excess of the olefin, and the hydrogen is present in an amount which is at least a molecular equivalent of the ammonia under treatment. It is preferable that the carbon monoxide or dioxide be present in a molecular ratio to olefin which is at least as great as 10:1, and a molecular ratio to ammonia which is at least as great as 10:2.

While space velocity does not play a critical part in the invention, the preferred practice of the invention involves use of space velocities between 1000 and 7000 cu. ft. of reactant gas mixture per cu. ft. of catalyst per hour. The particular space velocity employed will, of course, depend on the various other conditions of the reaction, as discussed above.

The following examples illustrate the practice of the process.

*Example I*

A stainless steel catalyst chamber of approximately 2 cubic feet capacity is filled with a pelleted mixture of 10% manganese oxide and 90% zinc chromate. The catalyst is activated by the passage of a hydrogen-ammonia mixture at 350° C. and atmospheric pressure for 5 hours. By suitable compressors a mixture of the following gases in the indicated respective molar ratios is pumped into the mixing preheater at a space velocity of 2000; 30 carbon monoxide:5 hydrogen:3 ammonia:1 ethylene. The temperature is held at 350° C. by circulating a heat transfer liquid through the jacket of the reactor. A pressure of 8700 pounds per square inch is maintained by a pressure regulating valve at the exit side of the reactor. The crude product is led to a gas-liquid trap still under 1000 pounds per square inch pressure, where the excess carbon monoxide and hydrogen is bled off and recycled. The liquid product is fractionated through a system of two columns. The first column removes ammonia under 200 pounds pressure. The residue is then distilled at atmospheric pressure through the second column. One of the fractions is pure n-propylamine.

*Example II*

In the same apparatus as described in Example I is placed an activated charcoal catalyst impregnated with a mixture of manganese phosphate, zinc chromate and nickel nitrate. After activating the catalyst by the passage of a mixture of ammonia and hydrogen at 350° C. and atmospheric pressure for 5 hours a mixture of the following gases in their respective molar ratios is pumped into the mixing preheater at a space velocity of 3000. 20 carbon monoxide:6 hydrogen:4 ammonia:1 ethylene. The temperature is kept between 360 and 390° C. and the pressure at 13,000 to 13,500 pounds per square inch. On working up the crude product as described in Example I n-propylamine is obtained in the liquid product. A mixture of higher boiling nitrogen compounds is obtained as a residue.

*Example III*

In the same apparatus as described in Example I is placed a silica gel catalyst impregnated with iron oxide, calcium chloride, manganese phosphate and copper in a concentration of approximately 1% each. The catalyst is activated with hydrogen and ammonia the same as in Example I. A mixture in the following mole ratio is then passed through the system at a space velocity of 2000. 40 carbon monoxide:10 hydrogen:6 ammonia:1 butylene. The reaction temperature is 275–308° C. and the pressure is 5500 pounds per square inch. On working up the crude product as described in Example I, a mixture of amyl amines is obtained.

*Example IV*

In a double reactor set up in series is placed an activated carbon catalyst impregnated with approximately 1% each of phosphoric acid and molybdic acid in the first reactor and finely powdered and pelleted nickel catalyst in the second reactor. A mixture of the following gases in their respective mole ratios is then passed through. 30 carbon monoxide:8 hydrogen:5 ammonia:1 ethylene. The first reactor is held at 340–350° C. and the second is kept at 250–275° C. at a space velocity of 2000 and 10,000 pounds pressure. On working up the crude product as described in Example I, n-propylamine is obtained in the liquid product.

*Example V*

In the same apparatus as described in Example I are placed an activated charcoal catalyst impregnated with phosphomolybdic acid, iron oxide, finely divided nickel and zinc chromate. The catalyst is activated by heating to 250° C. for 5 hours in a current of ammonia and hydrogen. A mixture of gases in their respective mole ratios is then pumped through the system. 25 carbon monoxide:8 hydrogen:6 monomethylamine:1 propylene. The temperature is held between 275–300° C. and the pressure between 11,800 and 12,000 pounds per square inch. The space velocity is kept between 1800 and 2000. When the crude product is worked up as described in Example I, one of the components of the liquid is methyl isobutylamine, a secondary amine boiling 67–70° C., specific gravity 0.735 at 20° C.

*Example VI*

In the same apparatus as described in Example I is placed an Activated Alumina catalyst impregnated with manganese phosphate and copper chromite in a concentration of approximately 2% each. The catalyst is activated with hydrogen and ammonia the same as in Example I. A mixture in the following mole ratio is then passed through the system, 20 carbon dioxide:20 hydrogen:6 ammonia:1 propylene. The reaction temperature is 325–350° C., the pressure is 9000 to 10,000 pounds per square inch and the space velocity is 2000. On working up the crude product by distillation after washing with dilute caustic there is obtained a mixture of isobutylamines.

*Example VII*

In the same apparatus as described in Example I is placed a silica gel catalyst impregnated with phosphomolybdic acid and copper nitrate in a concentration of approximately 2% each. The catalyst is activated with hydrogen and ammonia the same as in Example I. A mixture in the following mole ratio is then passed through the system, 20 carbon dioxide:20 hydrogen:6 methylamine:1 ethylene. The reaction temperature is 350–375° C., the pressure is 15,000 to 20,000 pounds per square inch. On working up the crude product by distillation after washing with dilute caustic there is obtained as one component in the distillate methyl propylamine, a secondary amine boiling 62–65° C., specific gravity 0.717 at 20° C.

While the above discussion pertains principally to use of open chain olefins, cycloaliphatic olefins such as cyclohexene may also be used to form cycloaliphatic amines in the practice of the invention.

Modifications will be obvious to those skilled in the art, and we do not therefore wish to be limited except by the scope of the following claims.

We claim:

1. The process of maunfacturing aliphatic amines which comprises mixing together an olefin, an oxide of carbon, hydrogen and an aminating agent chosen from the class consisting of ammonia and primary and secondary amines, and passing said mixture over a heated hydrogenation-dehydration catalyst to form the desired amine.

2. The process of manufacturing aliphatic amines which comprises mixing together an olefin, an oxide of carbon, hydrogen and an aminating agent chosen from the class consisting of ammonia and primary and secondary amines, and contacting said mixture at a temperature between 250 and 450° C. with a hydrogenation-dehydration catalyst to effect reaction to form the desired amine.

3. The process of manufacturing aliphatic amines which comprises mixing together an olefin, an oxide of carbon, hydrogen and an aminating agent chosen from the class consisting of ammonia and primary and secondary amines, and contacting said mixture at a temperature between 250 and 450° C. and a pressure above 500 pounds per square inch with a hydrogenation-dehydration catalyst to effect reaction to form the desired amine.

4. The process of manufacturing aliphatic amines which comprises mixing together an olefin containing between 2 and 10 carbon atoms, an oxide of carbon, hydrogen and an aminating agent chosen from the class consisting of ammonia and primary and secondary amines, and contacting said mixture in vapor phase at a temperature between 325 and 375° C. in the presence of a hydrogenation-dehydration catalyst to form the desired amine.

5. The process of manufacturing aliphatic amines which comprises mixing together an olefin containing between 2 and 10 carbon atoms, an oxide of carbon, hydrogen and an aminating agent chosen from the class consisting of ammonia and primary and secondary amines, and contacting said mixture in vapor phase at a temperature between 325 and 375° C. at a pressure in excess of 500 pounds per square inch with a hydrogenation-dehydration catalyst to form the desired amine.

6. The process of manufacturing amines which comprises mixing together an olefin, an oxide of carbon, hydrogen and an aminating agent chosen from the class consisting of ammonia and primary and secondary amines, and passing said mixture over a mixture of hydrogenation and dehydration catalysts at a temperature between 250 and 450° C. and a pressure above 500 pounds per square inch to form the desired amine.

7. The process of manufacturing aliphatic amines which comprises mixing together an olefin containing between 2 and 5 carbon atoms, an oxide of carbon, hydrogen and an aminating agent chosen from the class consisting of ammonia and primary and secondary amines, and heating said mixture to a temperature between 325 and 375° C. at a pressure in excess of 500 pounds per square inch in the presence of a hydrogenation-dehydration catalyst to form the desired amine.

8. The process of manufacturing aliphatic amines which comprises mixing together an olefin containing between 2 and 5 carbon atoms, an oxide of carbon, hydrogen and an aminating agent chosen from the class consisting of ammonia and primary and secondary amines, and contacting said mixture at a temperature between 325 and 375° C. with a hydrogenation-dehydration catalyst to form the desired amine.

9. The process of manufacturing aliphatic amines which comprises mixing together an olefin, an oxide of carbon, ammonia and hydrogen and passing said mixture at a temperature between 250 and 450° C. and a pressure above 500 pounds per square inch over a single hydrogenation-dehydration catalyst, and thereby effecting reaction to form the desired amine.

JOHN F. OLIN,
THOMAS E. DEGER.

REFERENCES CITED

The following references are of record in the file of this patent:

UNITED STATES PATENTS

| Number | Name | Date |
|---|---|---|
| 1,698,602 | Mittasch | Jan. 8, 1929 |
| 1,532,428 | Meyer | Apr. 7, 1925 |
| 2,049,467 | Mnookin | Aug. 4, 1936 |
| 2,160,058 | Covert | May 30, 1932 |

FOREIGN PATENTS

| Number | Country | Date |
|---|---|---|
| 350,502 | Great Britain | June 15, 1931 |
| 479,079 | Germany | Sept. 10, 1930 |